UNITED STATES PATENT OFFICE.

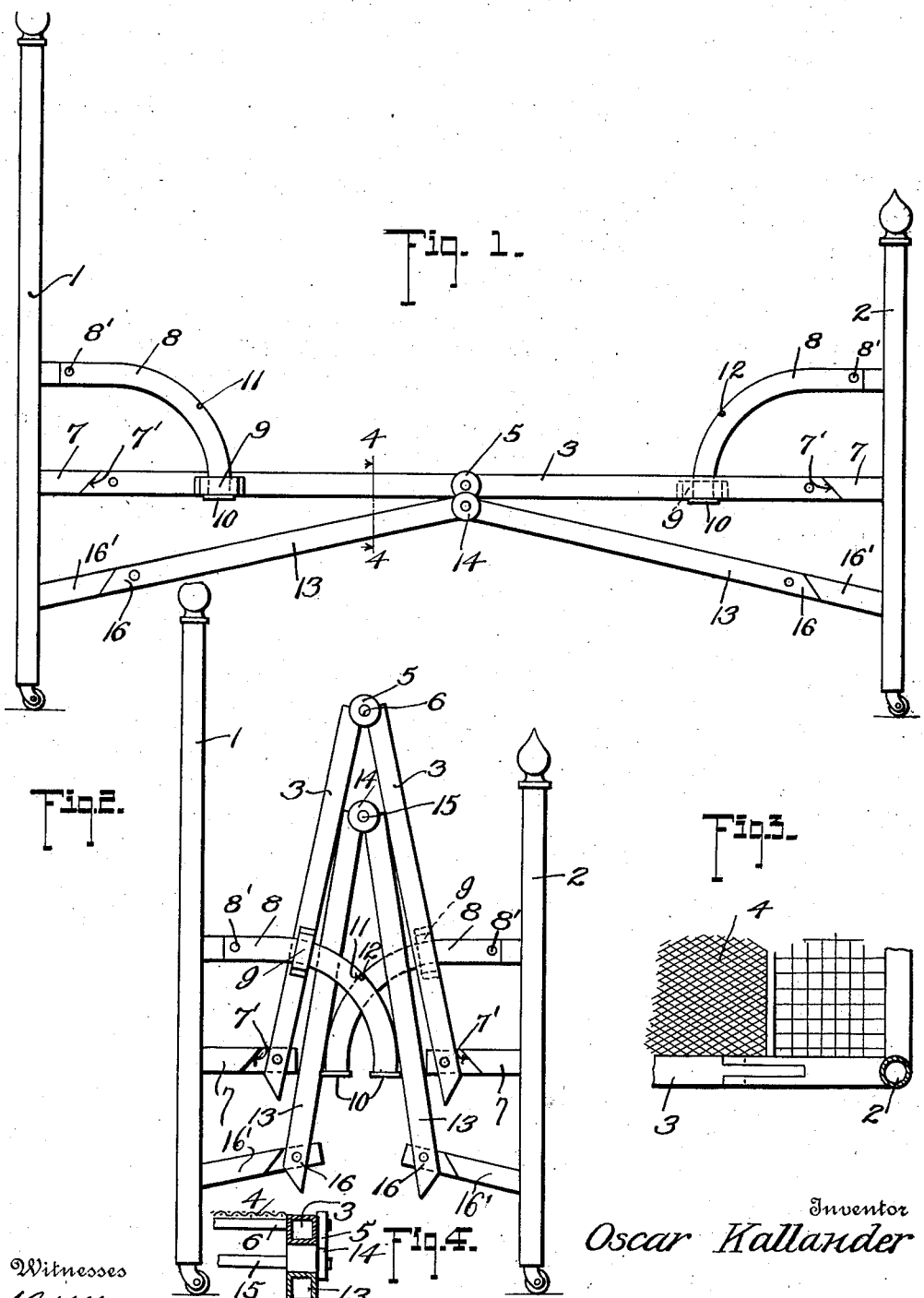

OSCAR KALLANDER, OF JAMESTOWN, NEW YORK.

FOLDING BED.

1,021,607.  Specification of Letters Patent.  Patented Mar. 26, 1912.

Application filed December 8, 1911. Serial No. 664,653.

*To all whom it may concern:*

Be it known that I, OSCAR KALLANDER, a citizen of the Kingdom of Sweden, residing at Jamestown, in the county of Chautauqua and State of New York, have invented certain new and useful Improvements in Folding Beds, of which the following is a specification.

This invention relates to improvements in folding beds, its primary object being to provide a structure which will be simple and cheap from a manufacturing standpoint, and readily foldable to occupy a minimum amount of space when not in use or for transportation purposes.

A further object of my invention is to provide locking means for holding the bedstead in folded position, said locking means constituting also additional supporting means when the bed is in extended operative position.

With the above and other objects in view, this invention consists of the construction, combination, and arrangement of parts, all as hereinafter more fully described, claimed and illustrated in the accompanying drawings, wherein, Figure 1 is a side elevation of a bed constructed in accordance with my invention. Fig. 2 is a side elevation of the bed in folded and locked position. Fig. 3 is a partial plan view of one of the side rails showing a modified form of butt joint. Fig. 4 is a vertical section on the line 4—4 of Fig. 1, showing the transverse rods forming the pivotal connections for the side rails and auxiliary braces.

Throughout the following detail description and on the several figures of the drawings, similar parts are referred to by like reference characters.

Referring now to the drawings, the bedstead comprising my invention consists of the usual uprights or posts 1 and 2, constituting the head and foot sections respectively, which are connected by means of the side rails 3. The side rails 3 form spring supporting members and are preferably provided with the usual spring 4 secured thereto, as most clearly shown in Fig. 3 of the drawings. Said rails 3 have central pivotal connections, indicated at 5, and are connected by the transverse pivot rod 6. Extending from the head and foot sections 1 and 2 are short horizontal arms or extensions 7 having their outer extremities inclined to form the butt joints 7' connecting the side rails 3 with the sections aforesaid.

Suitably secured above the side rails 3 to the head and foot sections 1 and 2, are the curved or arc-shaped locking members 8 jointed at 8', said members passing through guide keepers 9 secured at opposite sides of each of the rails 3, and being formed at their lower extremities with enlarged heads 10 which co-act with the butt joints 7' to limit the downward movement of the side rails and support them in horizontal position when the bed is in extended operative position.

In one of the locking members 8 is provided a slot 11 adapted to interlock with the lug 12 extending laterally from the opposite locking member 8 when the bed is folded into inoperative position, shown most clearly in Fig. 2 of the drawings.

To increase the rigidity of my bed, I provide auxiliary brace members 13 having central pivotal connections 14 on the transverse rod 15 immediately beneath the pivotal connections 5 and transverse rod 6 of the side rails 3. Said brace members 13 are formed with butt joints 16 at the extremities of the short arms 16' secured to the head and foot sections 1 and 2 respectively.

From the foregoing description, the advantages and operation of the invention will be apparent. By upward pressure on the side rails 3, the head and foot sections can be readily brought into closed inoperative position, said side rails breaking at the butt joints 7' and correspondingly the brace members 13 will be broken at the joints 16. By reason of the arc shaped locking members 8 being secured at opposite sides of the side rails 3, they will be permitted to pass each other until the lug 12 engages in a slot 11 when the bedstead will be locked in inoperative position. It will also be noted that the brace members 13 will tend to cause frictional engagement of the lock members 8, since said lock members pass between the brace members aforesaid and the side rails 3.

When in extended operative position, as shown in Fig. 1, the heads 10 on the locking members 8 co-acting with the butt joints 7' assist in supporting the side rails in horizontal position, the brace members 13 acting in the nature of auxiliary supporting means, since they preferably contact with the central portion of said side member.

In Fig. 3, I have shown a modified form of butt joint which may be used in lieu of those indicated at 7' and 16. Lateral strain or bulging of the side rails and brace members is effectually prevented by the transverse rods 6 and 15 respectively.

It will be apparent that in actual use of the bed, it may readily be brought into folded position with the bed clothing in position and thus afford use of much space occupied by the ordinary construction of bed.

Having thus fully described the invention, what is claimed as new is:—

1. In a folding bed, the combination of posts comprising head and foot sections, side rails pivotally mounted on the said sections at their extremities and having other pivotal connections intermediate their lengths, and means secured to the sections to support the rails when in extended operative position, said means interlocking to hold the bed in folded inoperative position.

2. In a folding bed, the combination of posts comprising head and foot sections, short horizontal arms secured to the sections, side rails jointed to the arms aforesaid and having other pivotal connections centrally thereof, locking means secured to the head and foot sections, guide members for the said locking members secured to opposite sides of the rails, enlarged heads formed on the extremities of the locking members co-acting with the joints of the side rails to support the bed in extended operative position, and a lug formed on one of the locking members adapted to engage in a slot in the opposite locking member to hold the bed in folded position.

3. In a folding bed, the combination of posts comprising head and foot sections, short horizontal arms secured to the sections, side rails having inclined extremities to form butt joints with the ends of the arms aforesaid and having pivotal connections centrally thereof, locking members secured to the head and foot sections above said arms, guide keepers secured to the opposite sides of the rails through which said locking members pass, enlarged heads formed on the extremities of the locking members against which the side rails are adapted to bear when in extended position, a lug formed on one of the locking members adapted to engage in a slot in the opposite locking member to hold the bed in folded position, other short arms secured to the head and foot sections beneath the first mentioned arms, auxiliary brace members jointed to said arms and having pivotal connections at their opposite ends, and transverse pivot rods connecting the respective central connections of the side rails and auxiliary brace members.

In testimony whereof I affix my signature in presence of two witnesses.

OSCAR KALLANDER.

Witnesses:
 ERNEST PETERSON,
 OLOF A. OLSON.

---

Copies of this patent may be obtained for five cents each, by addressing the "Commissioner of Patents. Washington, D. C."